United States Patent [19]

Lamatsch et al.

[11] Patent Number: 4,529,862

[45] Date of Patent: Jul. 16, 1985

[54] METHOD OF WELDING METAL BANDS TOGETHER

[75] Inventors: Hans Lamatsch, Nuremberg; Hans-Georg Rosen, Hohenschaftlarn, both of Fed. Rep. of Germany

[73] Assignee: Siemens Aktiengesellschaft, Munich, Fed. Rep. of Germany

[21] Appl. No.: 522,587

[22] Filed: Aug. 12, 1983

[30] Foreign Application Priority Data

Aug. 17, 1982 [DE] Fed. Rep. of Germany ....... 3230595

[51] Int. Cl.³ .............................................. B23K 27/00
[52] U.S. Cl. ...................... 219/121 LD; 219/121 LC; 219/121 LQ; 219/121 LU; 219/121 LW
[58] Field of Search ................. 219/121 LC, 121 LD, 219/121 LP, 121 LQ, 121 LU, 121 LV, 121 LW, 121 LX, 121 LE, 121 LF

[56] References Cited

U.S. PATENT DOCUMENTS

| 3,848,104 | 11/1974 | Locke | 219/121 LW |
|---|---|---|---|
| 4,001,543 | 1/1977 | Bore et al. | 219/121 LC |
| 4,029,932 | 6/1977 | Cook | 219/121 LY |
| 4,125,755 | 11/1978 | Plamquist | 219/121 LQ X |

FOREIGN PATENT DOCUMENTS

| 74393 | 6/1981 | Japan | 219/121 LD |
|---|---|---|---|
| 50294 | 3/1982 | Japan | 219/121 LC |

Primary Examiner—C. L. Albritton
Attorney, Agent, or Firm—Kenyon & Kenyon

[57] ABSTRACT

A method is disclosed for welding coiled metal bands together in a rotatable drum. An energy beam is introduced from an energy beam generator arranged stationary outside the drum coaxially into the interior of the drum. The energy beam is directed to a predetermined weld area by deflecting the energy beam at least once transversely, preferably at an angle of about 90°, from the axis of the drum.

13 Claims, 3 Drawing Figures

4,529,862

METHOD OF WELDING METAL BANDS TOGETHER

BACKGROUND OF THE INVENTION

The present invention relates to a method for welding the ends together of two finite length metal bands in a rotatable drum.

German Pat. No. 29 34 115 discloses a method for storing coiled or so-called endless metal bands from finite coiled lengths in which the end of an advancing finite length band is welded to the start of a following finite length band in a rotatable drum. The moving band material is temporarily formed into a further coiled or endless band, is stored, and is subsequently uncoiled from its wound condition for continuous further processing or treatment. Two band lengths to be welded together are gripped at their respective end and starting regions and are then wound together in two layers from opposite sides of a rotating drum in the same sense of rotation of the drum.

OBJECT AND SUMMARY OF THE INVENTION

It is an object of the present invention to provide a welding method for joining in a simple manner metal bands within a rotatable drum.

The above and other objects are achieved according to the invention by introducing the welding beam of an energy beam generator axially and preferably substantially coaxially with respect to the axis of a rotatable drum into the interior of the drum in which the ends of two metal lengths to be welded together are held outwardly of the axis of the drum and outwardly of the axis of introduction of the energy beam into the drum, and directing the beam transversely of its axis toward ends of the metal lengths to be welded to form a weld along the held ends of the metal lengths. The energy beam is directed substantially radially from its axis of introductin into the drum at least once, i.e. it is deflected at least once at an angle of about 90° from its axis of introduction to the drum. The energy beam weld generator is disposed stationary outside of the drum.

According to an aspect of the invention, the energy beam is introduced coaxially into the drum and first means for deflecting the energy beam is disposed movable along the axis of the drum so as to direct the energy beam and generate a weld seam transversely of the longitudinal axes of the metal bands. The joint formed by end butts of the metal bands to be welded are held fixed within the drum outwardly of the axis of rotation of the drum and parallel thereto.

According to another aspect of the invention, the energy beam is first deflected transversely of the axis of the drum in one direction away from the metal ends to be welded by a deflecting means and then deflected to the movable deflecting means. According to this aspect of the invention, a larger distance is provided between the movable deflecting means and the weld, which leads to improved protection of the movable deflecting means against welding sputter formation and vapors, and therefore assures longer service life of the movable deflecting means.

A further increase of the service life of the movable deflecting means can be achieved by offsetting the deflection angle of the movable deflection means from 90°, e.g. by up to about 45° in either direction. When welding at a location above the movable deflection means, the movable deflection means is then not exactly underneath the weld, so that a substantial part of the welding sputter can be intercepted adjacent the deflection means by protective elements.

An advantage in using an energy beam welding method (e.g. laser beam) for joining the metal bands within the drum is that it is not necessary to introduce the welding energy into a rotating drum through rotating connecting elements, for example, slip rings.

Each deflection means necessary according to the invention can be constructed relatively light-weight and compact, and can comprise, for example, a reflective surface. A deflection means can preferably comprise a first-mirror surface, for example.

The above and other objects, features, aspects and advantages of the present invention will be more readily perceived from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in which like numerals indicate similar parts and in which.

DESCRIPTION OF THE PREFERRED EMBODIMENTS

Figure 1:
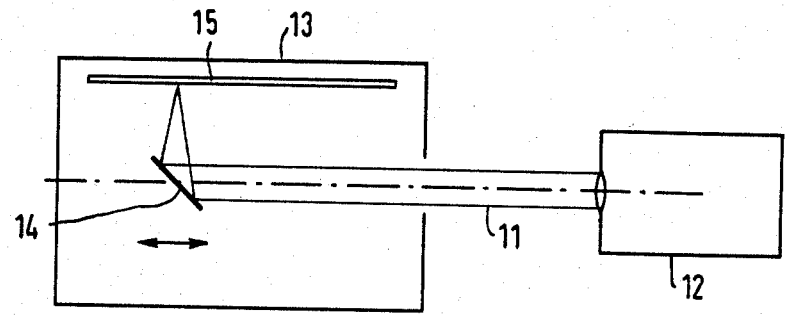
FIG. 1 is an axial sectional schematic diagram of apparatus for carrying out the method of the invention for welding metal bands together.

In FIG. 1, laser beam 11 emitted by an energy beam generator 12 is guided along the axis of a rotating storage drum 13 onto a deflection device 14 such as a reflective surface, preferably a first-surface mirror, and is deflected from the axis of the drum at an angle of about 90°. The deflection device 14 is moved parallel to the axis of the drum to deflect the beam transversely to the longitudinal axis of the bands to be welded. The deflected laser beam strikes predetermined points of the metal bands and generates the required weld seam.

Figure 2:
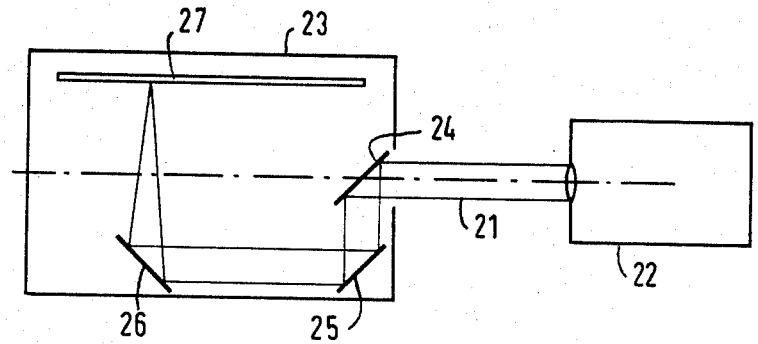
FIG. 2 is an axial sectional schematic diagram of apparatus for carrying out the method of the invention according to another embodiment thereof.

In FIG. 2, the laser beam 21 emanating from the energy beam generator 22 is conducted to the ends of the metal bands successively via deflection devices 24, 25 and 26. These deflection devices may again be, for example, reflective surfaces, preferably first-surface mirrors. The last deflection device 26 is moved parallel to the axis of the drum 23. The arrangement depicted in FIG. 2 enables the movable deflection device 26 to be placed at a greater distance from the weld 27, thereby increasing the service life of that device.

Figure 3:
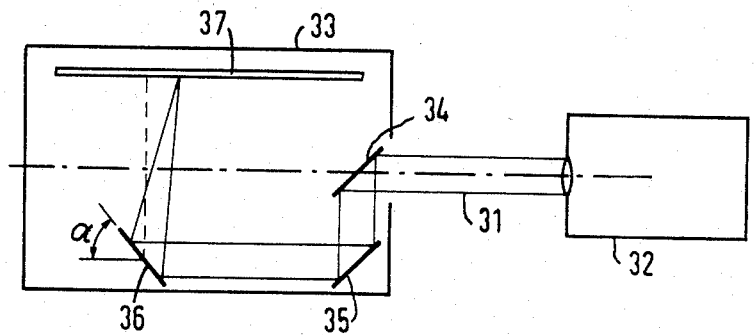
FIG. 3 is an axial sectional schematic diagram of apparatus for carrying out the method of the invention according to another embodiment thereof.

A further increase of the service life of the movable deflection device can be achieved according to the arrangement of FIG. 3. The laser beam 31 from the energy beam generator 32 enters the drum 33 axially and is first deflected by the deflection device 34 by 90° and strikes the second deflection device 35. The deflection device 35 deflects the laser beam by 90° and the laser beam then strikes the third deflection device 36. The deflection device 36 is moved parallel to the axis of the storage drum 33. This movable deflection device 36 is however set at an angle α of between about 45° and 135° with respect to the axis of the drum. When set at an angle other than 90° so as to offset the deflected beam from 90°, the device 36 is not exactly below the weld 37 and avoids a substantial amount of welding sputter.

Certain changes and modifications of the embodiments of the invention discloses herein will be readily apparent to those skilled in the art. It is the applicants' intention to cover by the claims all those changes and modifications which could be made to the embodiments of the invention herein chosen for the purpose of disclosure without departing from the spirit and scope of the invention.

What is claimed is:

1. A method for welding metal bands together within a rotatable drum having an axis of rotation, said method comprising the steps of holding the ends of two metal bands within the rotatable drum and outwardly of the axis of the drum, introducing an energy beams from an energy beam generator disposed stationary outside the drum axially into the interior of the drum, transversely deflecting by a movable reflective surface the energy beam from its axis of introduction into the drum outwardly in the drum to a predetermined weld area, and moving the reflective surface parallel to the axis of the drum to generate a weld seam at the ends of the metal bands, the weld seam extending transversely to the longitudinal axes of the metal bands.

2. The method according to claim 1 wherein the energy beam is introduced coaxially with the axis of the drum into the drum.

3. The method according to claim 2 wherein the energy beam is deflected at an angle of about 90° from the axis of the drum at least once before reaching the predetermined weld area.

4. The method according to claim 2 wherein the energy beam is directed to the reflective surface along the axis of the drum which deflects the beam to the predetermined weld area.

5. The method according to claim 2 wherein the energy beam is conducted successively by two stationary reflective surfaces and then by the movable reflective surface which is movable parallel to the axis of the drum.

6. The method according to claim 2 wherein laser beam welding of the two metal bands is conducted.

7. The method according to claim 4 wherein the reflective surface is a first-surface mirror.

8. The method according to claim 5 wherein the stationary and movable reflective surfaces are first-surface mirrors.

9. The method according to claim 4 wherein the energy beam is deflected from the movable surface at an angle of from about 45° to about 135° with respect to the axis of the drum before reaching the predetermined weld area.

10. The method according to claim 9 wherein the energy beam is deflected at an angle other than about 90° with respect to the axis of the drum.

11. The method according to claim 2 wherein the energy beam is a laser beam.

12. A method for welding metal bands together within a rotatable drum having an axis of rotation, said method comprising the steps of introducing an energy beam from an energy beam generator disposed stationary outside the drum substantially coaxially into the interior of the drum, transversely deflecting by a first stationary reflective surface the energy beam from its axis of introduction into the drum outwardly in the drum to a second stationary reflective surface located proximate to the drum, deflecting the energy beam by the second stationary reflective surface into a path spaced from and substantially parallel to the axis of the drum, and transversely deflecting the energy beam by a movable reflective surface located proximate to the drum to a predetermined weld area located in the drum on a side of the axis thereof substantially opposite the movable reflective surface.

13. The method according to claim 12 wherein the energy beam is deflected from the movable reflective surface at an angle of from about 45° to about 135° with respect to the axis of the drum before reaching the predetermined weld area.

* * * * *